(No Model.)   7 Sheets—Sheet 1.

G. W. STEELE.
MACHINE FOR SHAPING SASH RAILS.

No. 305,485.  Patented Sept. 23, 1884.

Witnesses  Inventor
Richard A. Heely  George W. Steele
Kittie Inglis  John Inglis atty (No Model.)

G. W. STEELE.
MACHINE FOR SHAPING SASH RAILS.

No. 305,485. Patented Sept. 23, 1884.

(No Model.)  7 Sheets—Sheet 3.

G. W. STEELE.
MACHINE FOR SHAPING SASH RAILS.

No. 305,485.  Patented Sept. 23, 1884.

Witnesses
Richard A. Healy
Kittie Inglis

Inventor
George W. Steele
John Inglis atty (No Model.)

G. W. STEELE.
MACHINE FOR SHAPING SASH RAILS.

No. 305,485.  Patented Sept. 23, 1884.

Witnesses
Richard A. Healy
Kittie Inglis

Inventor
George W. Steele
by John Inglis atty (No Model.)

G. W. STEELE.
MACHINE FOR SHAPING SASH RAILS.

No. 305,485. Patented Sept. 23, 1884.

Witnesses
Richard A. Healy
Kittie Inglis

Inventor
George W. Steele
John Inglis

N. PETERS, Photo-Lithographer, Washington, D. C.

(No Model.)

G. W. STEELE.
MACHINE FOR SHAPING SASH RAILS.

No. 305,485. Patented Sept. 23, 1884.

Witnesses
Richard A. Healy
Kittie Inglis

Inventor
George W. Steele
John Inglis atty

(No Model.)  G. W. STEELE.  7 Sheets—Sheet 7.

MACHINE FOR SHAPING SASH RAILS.

No. 305,485. Patented Sept. 23, 1884.

Witnesses
Richard A. Healy
Kittie Inglis

Inventor
George W. Steele
John Inglis atty

UNITED STATES PATENT OFFICE.

GEORGE W. STEELE, OF PATERSON, NEW JERSEY.

MACHINE FOR SHAPING SASH-RAILS.

SPECIFICATION forming part of Letters Patent No. 305,485, dated September 23, 1884.

Application filed November 7, 1883. (No model.)

*To all whom it may concern:*

Be it known that I, GEORGE W. STEELE, a citizen of the United States, residing at Paterson, Passaic county, State of New Jersey, have invented a new and useful Improvement in Machines for Shaping Sash-Rails, of which the following is a specification, reference being had to the accompanying drawings, forming a part thereof.

The object of my invention is to produce a machine which will rapidly form, shape, and complete sash-rails by one continuous operation.

The invention consists of various devices and driving mechanism, which will hereinafter be fully explained.

Figure 5:
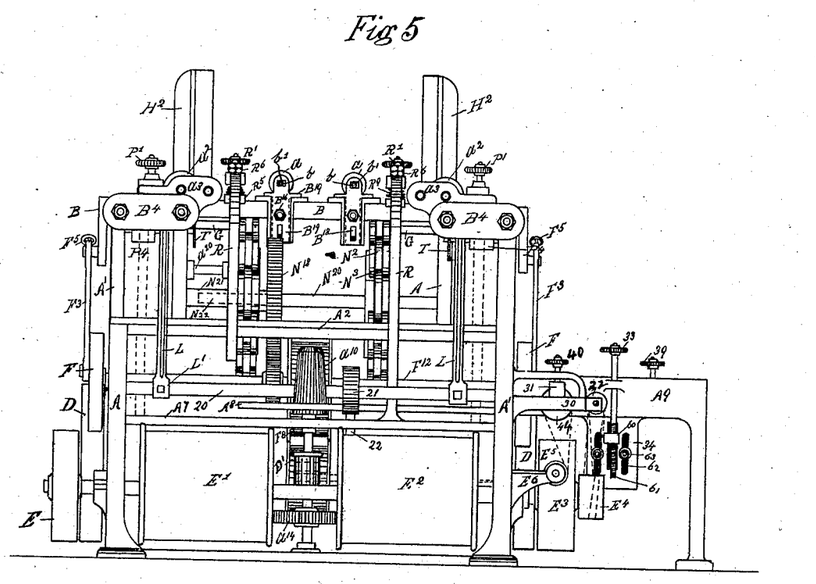
Fig. 5 is a rear elevation of the same.

A represents the main frame of the machine, to and on which there are arranged and secured the various devices and driving mechanism, as follows:

Suitably located in the back part of the machine there is journaled in bearings prepared therefor in the frame A a driving-shaft, S, having on one end of the same a pulley, E, and on the other end a pulley, $E^3$, and having more centrally arranged and secured thereon drums $E'$ $E^2$, as shown in Fig. 5.

Figure 1:
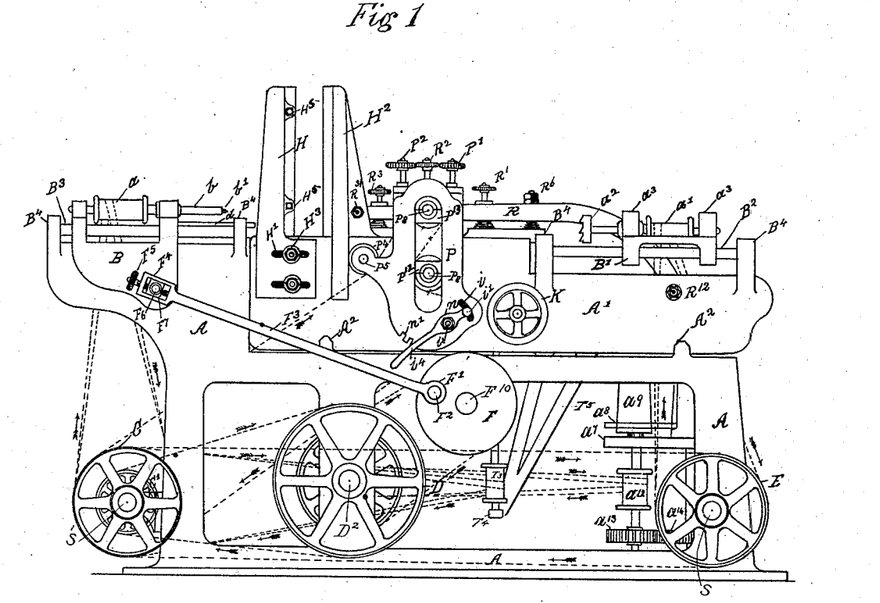
Figure 1 of the drawings represents one side of the machine in elevation, partly movable.
Figure 2:
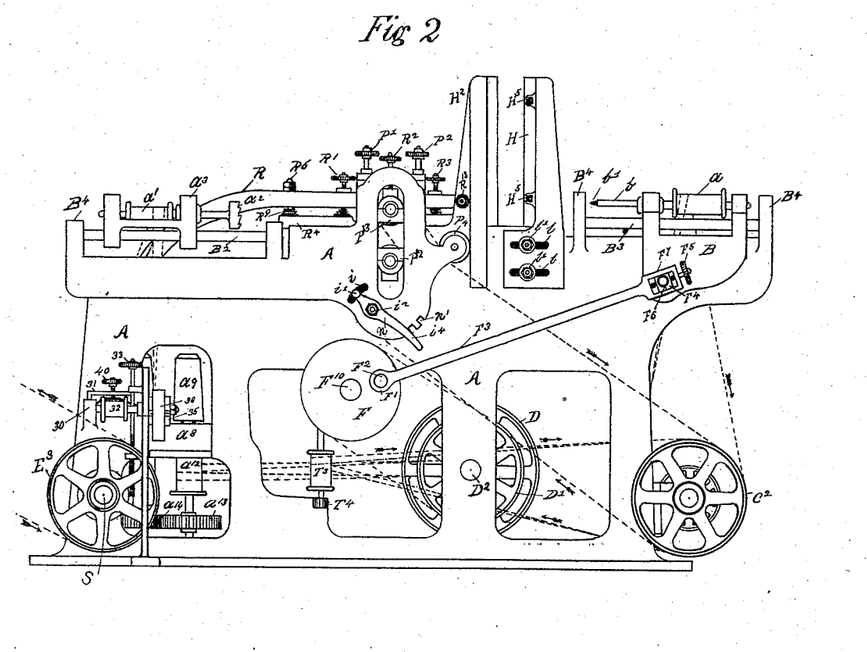
Fig. 2 is an elevation of the opposite side of the machine.
Figure 3:
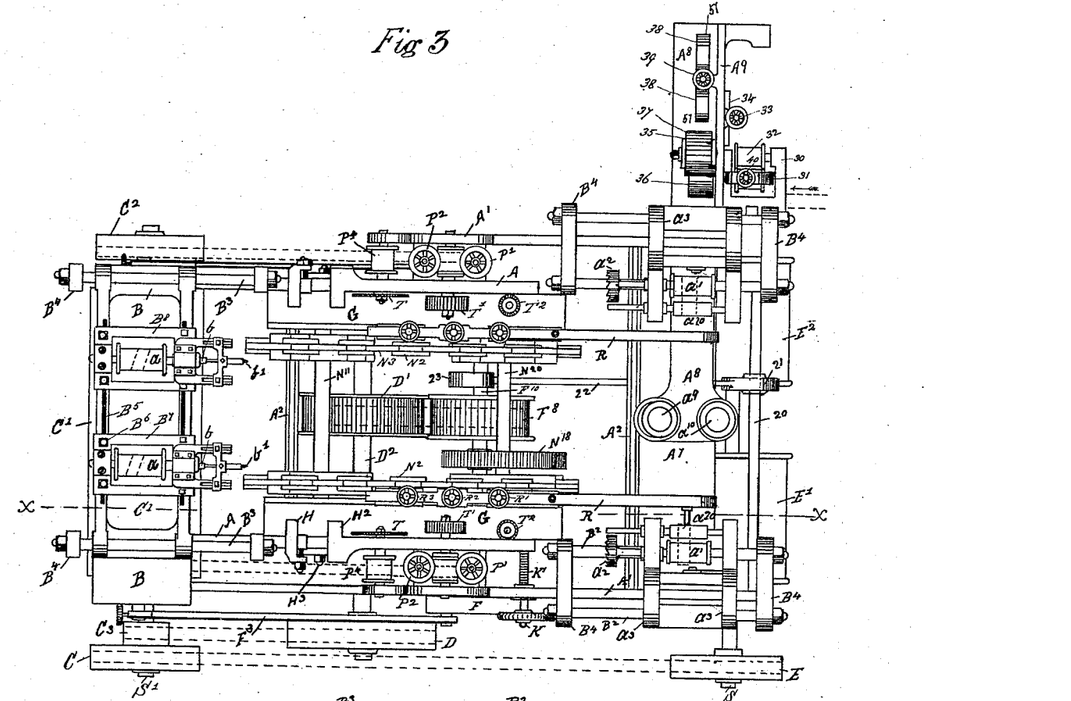
Fig. 3 is a plan of the machine.
Figure 4:
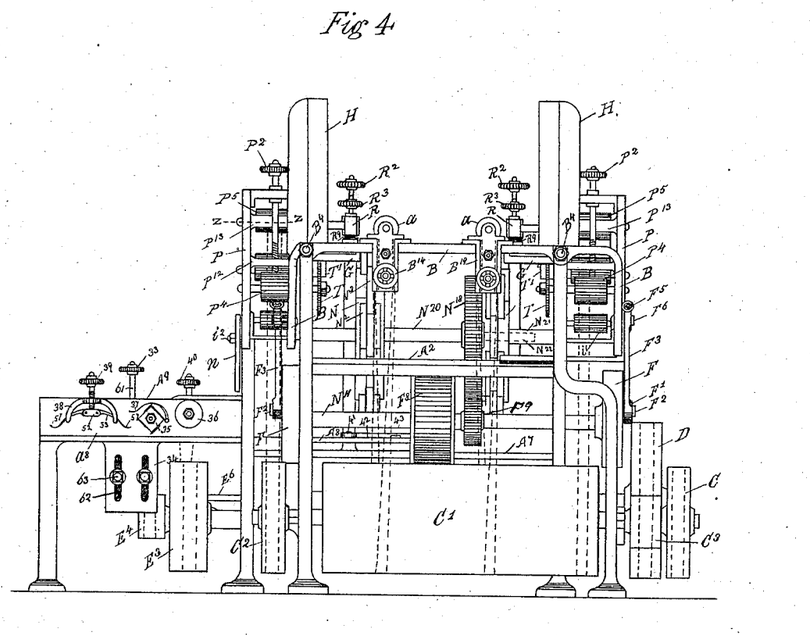
Fig. 4 is a front elevation of the same.
Figure 6:
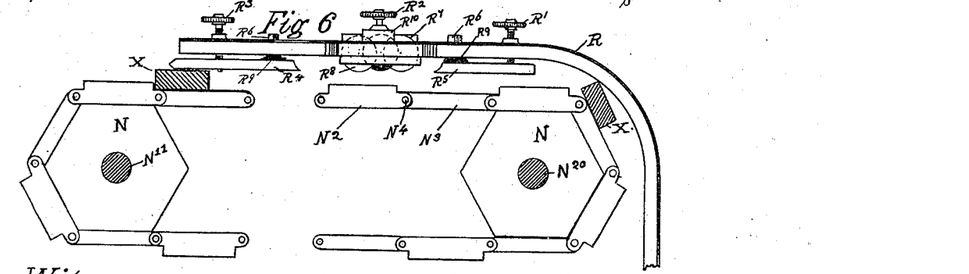
Fig. 6 is detailed view of the carrying mechanism and guides, part sectional.
Figures 13, 14:
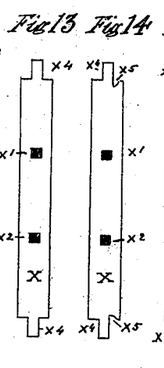
Fig. 13 is a plan of the rail having the tenons formed.
Fig. 14 is the same having copes formed.
Figures 15, 16, 17, 18:
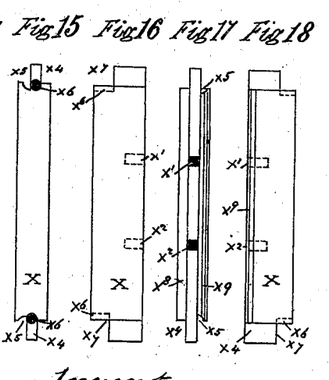
Fig. 15 is the same having holes bored for the relish.
Fig. 16 is the same with the relish formed.
Figs. 17 and 18 show the rails molded and completed.
Figure 19:
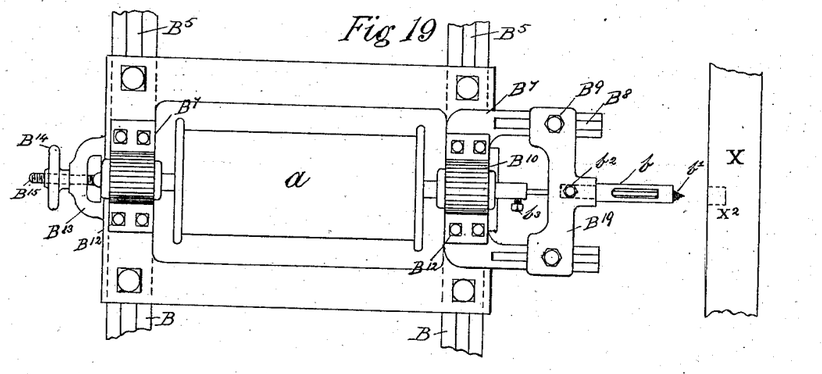
Fig. 19 is a plan of boring and mortising mechanism.
Figures 20, 21, 22, 23:
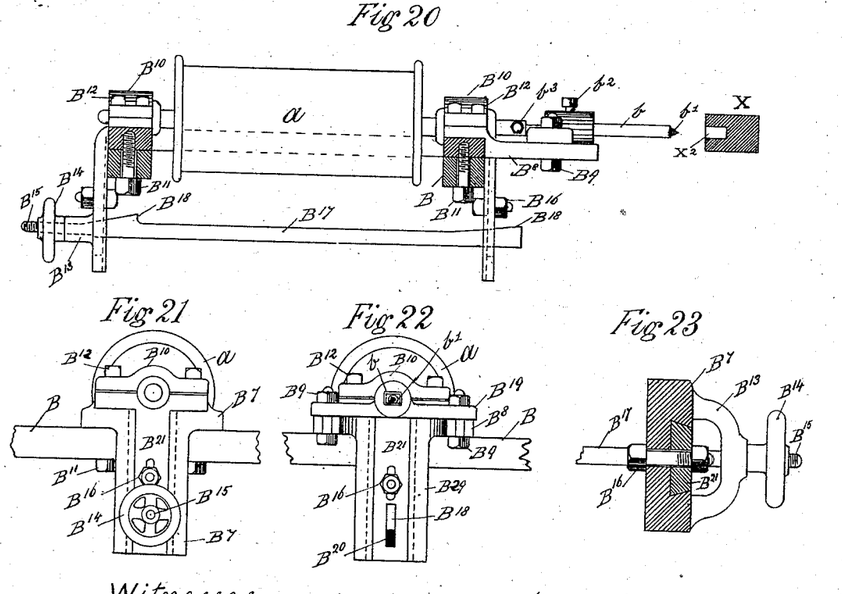
Fig. 20 is an end elevation of the same.
Fig. 21 is a front elevation of the same.
Fig. 22 is a rear elevation of the same.
Fig. 23 is a plan, part sectional.
Figure 24:
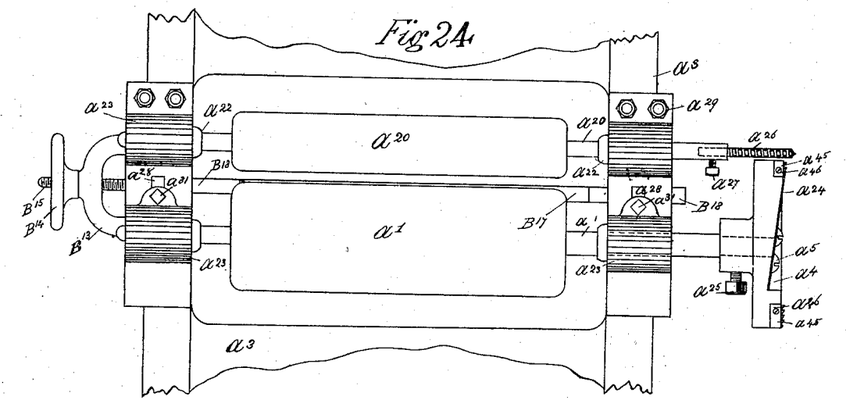
Fig. 24 is a plan of the relishing mechanism.
Figure 25:
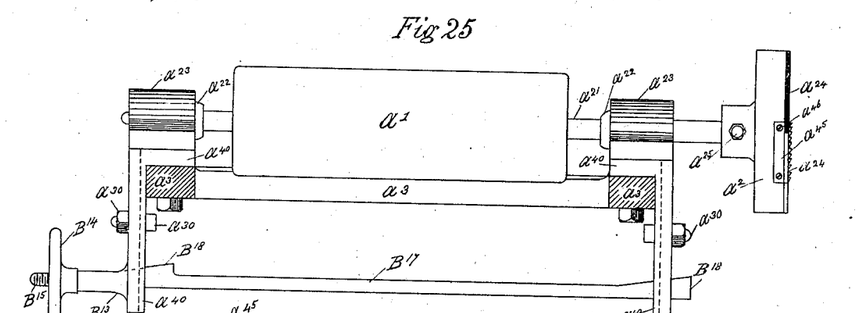
Fig. 25 is the same in elevation.
Figures 26, 27:
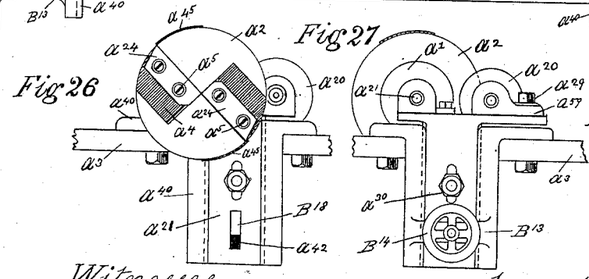
Fig. 26 is a front elevation of the same.
Fig. 27 is a rear elevation of the same.
Figure 28:
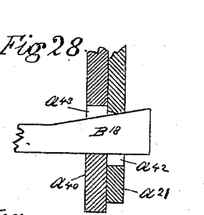
Fig. 28 is a section of the adjusting mechanism.

At the front of the machine there is journaled in bearings provided therefor in the frame A a shaft, $S'$, which shaft is provided at one end with pulleys C and $C^3$, and at its other end with a pulley, $C^2$, and centrally with a drum, $C'$, as shown in Fig. 4. More centrally located and journaled in suitable bearings arranged in the frame A there is a shaft, $D^2$, having arranged and secured on one end of the same a pulley, D, and more centrally arranged thereon a pulley, $D'$. More elevated there is journaled in bearings secured to the frame of the machine a shaft, $F^{10}$, having arranged and secured on the ends of the same crank-disks F F, and more centrally arranged and secured thereon pulley $F^8$ and gear-wheel $F^9$, as shown in Figs. 2 and 14. More elevated on the machine, and journaled at one end in the frame A, and at the other in telescoping shafts $N^2$, said telescoping shafts being journaled in the movable frame $A'$, are shafts $N^{11}$ $N^{20}$, on one end of which shafts there are arranged and secured hexagon-disks N N, the telescoping shafts having arranged and secured on them like hexagon-disks, which disks carry chains, which chains are composed of inner links, $N^3$, and outer links, $N^2$, the links being connected by pivot-bolts $N^4$. The links $N^2$ are made wider than the links $N^3$, as shown in Figs. 3 and 6. Above the carrying-chains there are located guide-bars R R, said bars having curved ends. One of the bars R is secured at one end to the frame by a bolt, $R^{13}$, and at its curved end to the plate $A^7$, which plate is secured to the different sides of the frame of the machine. The other bar R is secured to the movable frame $A'$ by a bolt, $R^{31}$, at one end of the same, and at its curved end to a stud, $R^{12}$, which stud is secured to the movable frame $A'$. Said movable frame is arranged on and slides over slide-bars $A^2$ $A^2$, which bars are secured to the frame A, the movable frame having suitable grooves to accommodate slide-bars $A^2$ $A^2$, as shown in Fig. 1, the frame A' having a wheel and screw, K K', the screw having a corresponding screw-nut secured in the frame A, Figs. 1 and 3. On the under side of the guide-bars R R there are adjustably secured plates $R^4$ $R^5$, which plates are adjustably held by screws R' $R^3$, springs $R^9$, and set-screws $R^6$, said screws passing through the guide-bars. Arranged on guide-bars R R there are frames $R^7$, in which frames there are suitably-journaled guide-wheels $R^8$, which wheels are so arranged in their frame as to overlap each other. The frames $R^7$ are arranged in and are carried by frames $R^{10}$, and are provided with a wheel and screw $R^2$, as shown in Fig. 6. On the front of the machine, and suitably secured to projection $B^4$, are guide-rods $B^3$, on and over which rods moves a carriage, B, said carriage having suitable eyes to adapt the same to fit the slide or guide rods $B^3$. The carriage-frame is provided with slots $B^5$, that are longitudinally arranged in said frame, in which slots there are adjustably arranged and secured, by bolts $B^6$, slide-frames $B^7$, having arms $B^8$, to which arms there are adjustably secured, by bolts $B^9$, tool-stocks $B^{19}$, carrying hollow chisels $b$, secured by set-screw $b^2$, through which chisels pass boring-tools $b'$ $b'$, said boring-tools being arranged in the ends of tool-stocks $a a$ and secured in said tool-stocks by set-screws $b^3$ $b^3$. The tool-stocks $a a$ are journaled in bearings $B^{10}$, secured to the frames $B^{21}$ by bolts $B^{12}$, as shown in Figs. 19 and 20. The frames $B^{21}$ are arranged in vertical guides $B^{29}$, and are adjustably secured therein by bolts $B^{16}$, and are provided with a wedge-bar, $B^{17}$. Said bar is provided with a screw, $B^{15}$, and a wheel, $B^{14}$, and the screws $B^{15}$ are arranged in projections $B^{13}$, Figs. 20 to 23, inclusive. The ends of the carriage B are provided with studs $F^6$ $F^6$, on which studs there are journaled links $F^3$ $F^3$, said links having adjustable bearings $F^4$ arranged in openings $F^7$. Said bearings are secured adjustably by a screw, $F^5$. The opposite ends of the links $F^3$ $F^3$ are journaled on studs $F^2$ $F^2$, secured in crank-disks F F, which disks are arranged on the ends of shafts $F^{10}$. (Shown in Figs. 1 and 2.) To the projections $B^4$ on the back part of the machine there are secured slide-rods $B^2$. On and over said rods slide carriages $a^3$ $a^3$, which carriages have suitable eyes to adapt them to fit on the slide-rods $B^2$. On the carriages $a^3$ $a^3$ there are journaled in adjustable bearings $a^{23}$ shafts $a'$ $a^{20}$. The shafts are provided with collars $a^{22}$, to prevent the lateral movement of the same.

The shaft $a^{20}$ is provided with a boring-tool, $a^{26}$, which tool is secured in said shaft by set-screw $a^{27}$. The shaft $a'$ is provided with a relishing-head, $a^2$, having cutters $a^{24}$, secured in recesses $a^4$ by set-screws $a^5$. The periphery of said head is provided with saws $a^{45}$. Said saws are secured to the relishing-head by set-screws $a^{46}$, and said head is secured to the shaft $a'$ by set-screws $a^{25}$. The bearings of the shaft $a'$ are arranged in slots $a^{28}$, and are adjustably held therein by bolts $a^{31}$. The bearings $a^{23}$ are supported upon plates $a^{21}$, that are arranged to slide vertically in plates $a^{40}$, in which plates $a^{21}$ and $a^{40}$ are slots $a^{42}$ and $a^{43}$, in which slots there are arranged the wedge ends $B^{18}$ of bar $B^{17}$. The plates $a^{40}$ are secured to the carriages $a^3$ $a^3$ by bolts $a^{31}$, and the bearings are secured in plates $a^{40}$ by bolts $a^{30}$, as shown in Figs. 24 to 28, inclusive. The bar $B^{17}$ is provided with a screw, $B^{15}$, and wheel $B^{14}$. On the back part of the machine there is journaled, in the frame, A a shaft, 20, having suitably arranged and secured thereon a disk, 21, to which disk there is suitably secured a lever, 22. Said lever is arranged to engage with a cam, 23, which cam is secured on shaft $F^{10}$. The shaft 20 is provided with arms L, which arms are secured to shaft 20 by set-screws L', and are suitably bracketed at their upper ends to the frame or carriages $a^3$ $a^3$. (Shown in Fig. 5.)

Suitably located on and secured to the frame A and A' are vertical rail-guides H $H^2$. The guides H are adjustably secured to the frames by bolts $H^3$ $l'$ in slots H' and $l$, and are provided with vertical plates that are adjustably secured in slotted lugs, with which the guide H is provided, by bolts $H^5$.

Figure 8:
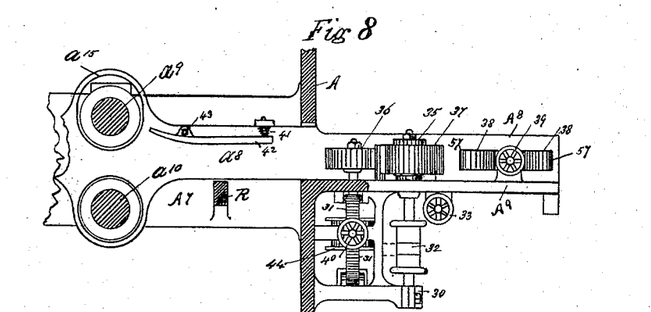
Fig. 8 is a plan of the molding mechanism, part sectional.
Figure 9:
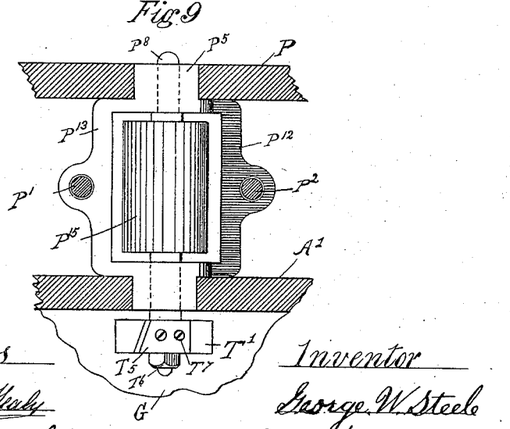
Fig. 9 is a plan of the tenon-head, part sectional.
Figure 10:
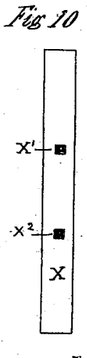
Fig. 10 is a plan of a rail, showing the mortises.
Figure 11:
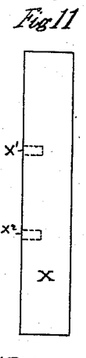
Fig. 11 is a side view of the same.
Figure 12:
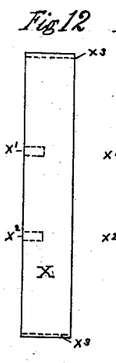
Fig. 12 is a side view of the same cut to a length.

On the inner sides of the frames A A' there are suitably arranged and secured tables G G, in which tables are arranged saws T T, tenon-heads T' T', and coping-tools $T^2$ $T^2$. The saws T T are provided with shafts and pulleys $P^4$ $P^4$, and are journaled in frames P P. The tenoning cutter-shafts $P^8$ $P^8$ are journaled in movable bearings $P^5$, the upper and lower shafts, $P^8$ $P^8$, on which are the upper and lower tenon-heads T' T', are provided with pulleys $P^{15}$ $P^{15}$, and the movable bearings $P^5$ $P^5$ are supported in frames $P^{12}$ $P^{13}$, which are adjusted by screws P' and $P^2$, that are arranged in frames P P, one of which frames is integral with the frame A, while the other is bolted to the frame A'. The tenon-heads are provided with cutters $T^5$, which cutters are secured suitably to said heads, and the heads are suitably secured to their shafts. The belts which rotate the tenon-heads T' T' are kept in tension by pulleys $i'$ $i'$, which pulleys are pivoted on the ends of levers $n$ $n$. Said levers are pivoted on frames P P by stud $i^2$ $i^2$. Said levers are adjustably arranged in slots $i$ $i$ and notches $n'$ $n'$. (Shown in Figs. 1 and 2.) The shafts carrying the coping-tools are vertically arranged in tables G G at the top and in steps $T^4$ $T^5$, the shafts having pulleys $T^3$, as shown in Figs. 1 and 2. The coping-shafts are provided with coping-tools $T^2$ $T^2$, Fig. 3. Suitably located in the back part of the machine are friction-cones $a^9$ $a^{10}$, which cones are arranged in bearings that are formed in plate or table $a^7$, centrally, and at the bottom in steps formed in the frame A. The cone $a^9$ is provided with a pulley, $a^{12}$, and a gear-wheel, $a^{13}$, which wheel meshes with a like gear-wheel, $a^{14}$, arranged and secured on the shaft of cone $a^{10}$, said cones having recesses formed therefor in the molding-table $a^8$. The cone $a^9$ is provided with a suitable space for adjustment, $a^{15}$, as shown in Fig. 8.

Figure 7:
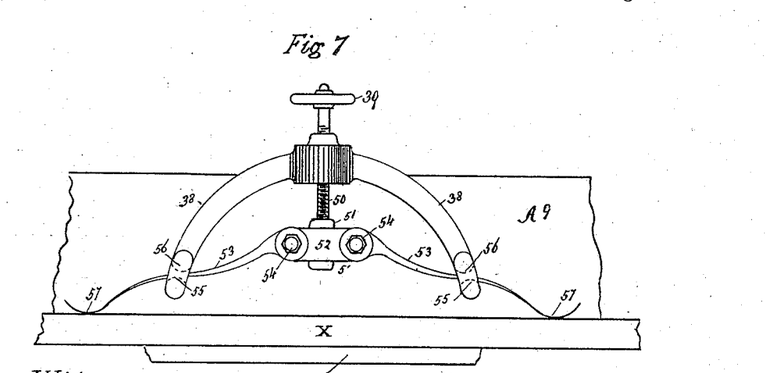
Fig. 7 is an elevation of the pressure-spring.

To the table $a^8$, which table is pivoted in the center to the frame A, there is arranged and adjustably secured by a bolt, 43, and spring 41, a guide-bar, 42. The molding-table $a^8$, outside of the frame A, (shown in Fig. 8,) is provided with a guard, $A^9$, which guard is bolted to the frame A. In said guard there are suitably journaled the shafts of feed-roller 36 and molding-head 35, and secured thereto spring 57 and cover 37, Fig. 4. The outer ends of the shafts are journaled in a bracket, 30. The molding-shaft is provided with a pulley, 32, and the feed-roller shaft with a pulley, 44, and spring 31, as shown in Fig. 8. At the back of the guard $A^9$ there is secured a plate, 34, and to the table $a^8$ a similar plate, which plates are provided with slots 62, in which slots are arranged bolts 63. The guard $A^9$ is provided with a screw, 61, that works in screw-nut 60 and wheel 33. The feed-roller is provided with a screw and wheel, 40, and the spring with a like wheel, and screw 39, Figs. 4, 5, and 8. The screw 39 is arranged in a screw-nut, 51, arranged and secured in a plate, 52, by bolts 54. The springs 53 have bearings 55 and 56, and extensions 57. (Shown in Fig. 7.)

Operation: Motion is given to the driving-shaft S in any usual way. The pulley E, by means of a belt, rotates the shaft S′, which shaft in turn, by means of pulley $C^3$ and belt, rotates the shaft $D^2$, which, by means of belt from pulley D′, rotates the shaft $F^{10}$, which in turn by gear-wheel $F^9$, that meshes with gear-wheel $N^{18}$, rotates the shaft $N^{20}$, and the shaft $N^{20}$, by means of the carrying-chains, rotates the shaft $N^{11}$. The cam 23, being in motion, engages lever 22, and in its engagement therewith rocks the shaft 20, which shaft, by means of levers or arms L, reciprocates the carriages $a^3$ $a^3$ and their working devices. The shaft $F^{10}$ reciprocates the carriage B by means of links $F^3$. The drums E′ $E^2$, by means of belts, rotate pulleys $a'$ $h^{20}$, boring-tool $a^{26}$, and relishing-head $a^2$. The drum C′, being in rotation, rotates by means of belts, pulleys $a$ $a$, and their shafts, and by means of said pulleys and shafts boring-tools $b'$ $b'$. The drum $c'$ and pulley $c^2$, both of which are in rotation, rotate by means of belts, saws T T and tenon-heads T′ T′, and coping-tools $T^2$ $T^2$. Motion is imparted by shaft $D^2$ to pulley $a^{12}$ by a belt, and by the same action to the friction-cone $a^9$, gear-wheel, $a^{13}$, and by means of said wheel to a like gear-wheel, $a^{14}$, that meshes therewith, and turns the friction-cone $a^{10}$, Fig. 2, pulley D′, and pulley $a^{12}$, rotates feed-roller 36 by means of a belt. Pulley $E^4$, by means of a belt, rotates the molding-head 35 and its shaft, Fig. 5. The machine having been put in motion in the manner stated, the rails to be shaped are placed in between the vertical guides H and $H^2$, one upon another, said guides having been adjusted to the width of said rails by the adjustments $H^3$ $l$. The carriage B, which is in reciprocation, carries tool-stocks $B^7$ $B^7$, their shafts and pulleys $a$ $a$, hollow chisels $b$ $b$, boring-tools $b'$ $b'$, which latter are in rotation, and which by the reciprocating movement of the carriage B are brought into forcible contact with the rail $x$. While in contact therewith the boring-tools $b'$ $b'$ bore the holes $x'$ $x^2$, followed by the chisels $b$ $b$, which square the holes made by the action of the bits or tools $b'$ $b'$, which action forms the mortises $x'$ $x^2$ for the bars of the sash, the reciprocating movement of the carriage B being in point of time just long enough to allow the boring-tools $b'$ $b'$ and chisels $b$ $b$ to perform the work stated, after which the carriage B retires, carrying with it the tool-stocks A A and $B^{19}$, their shafts, pulleys, boring-tools, chisels, &c. After this action the first rail placed in the vertical guides, which holds the next above in suitable position for the action of the boring-tools and chisels, as stated, is carried away without the action of the bits and chisels thereon by carrying-chains into contact with the sizing-saws T T, the rail being held down in position on the chain by presser-blocks $R^4$ $R^5$ and wheels $R^8$, adjusted by screws R′, $R^3$, and $R^2$. The saws, in their contact with the rail $x$, while the same is passing, remove the inequalities $x^3$. The tenon-heads T′ T′, having been adjusted by the screws P′ $P^2$ in their contact with the rail $x$, while the same is passing, form the tenons $x^4$ on the ends of the rail. The rail is carried forward by the chains into contact with the coping-tools $T^2$ $T^2$, which tools in their action on the rail $x$ form the copes $x^5$. The carriages $a^3$ $a^3$, which carry tool-stocks $a'$ $a^{20}$, being in reciprocation, advance on the guides $B^2$ and bring the boring-tools $a^{26}$ and relishing-heads $a^2$, both of which are in rotation, into contact with the rail $x$, and in such contact the boring-tools $a^{26}$ $a^{26}$ bore the holes $x^6$ and the heads $a^2$ $a^2$ with their cutters $a^{24}$ $a^{24}$, and saws $a^{45}$ $a^{45}$ form the relishes $x^7$. After this action the carriages $a^3$ $a^3$ and their operating devices retire on the guides, and the rail $x$ is carried by the chains down the curves under guide-bars R R, as shown in Fig. 6, until the rail $x$, by gravity, falls between the friction-cones $a^9$ $a^{10}$, which cones change the course of the rail $x$ to one at right angles with its previous motion. The motion of the rail $x$ is continued by the cones, guided by bar 42, until the end of the rail passes under feed-roller 36, which roller passes the rail $x$ into its contact with the molding-head 35, said head, which is in rotation, having been adjusted to the thickness of the rail by screw 61 and wheel 33, which adjusts the molding-table and work to the cutter-head, is adapted to shape the rail as desired, and while the rail is passing under the same it forms the rabbet $x^8$ and molding $x^9$ on the rail $x$, after which the rail passes under the pressure-springs 57 and drops from the machine, having been shaped and completed, as stated and shown, by one continuous operation. More or less draft can be given to the feed or draft roller 36 by screw 40, and the springs 57 can have more or less tension given to them by the screw 39. The movable frame A′, by means of the screw $k'$, hand-wheel $k$, and telescoping shafts $N^{21}$, can be moved on the slide-bars $A^2$, with its operating devices, to suit the various lengths of rails to be shaped. The tool-stocks $a\ a$ are adjusted in the slots $B^5$ in the carriage B to suit the various positions where mortises are to be made for the different lengths of rails to be shaped, and are held to their several adjustments by the bolts $B^6$ and $B^{12}$, and are vertically adjusted by inclines or wedges $B^{18}$, under the influence of screw $B^{15}$ and wheel $B^{14}$, and are held to their adjustments by bolts $B^{11}\ B^{16}$. The stocks $B^{19}\ B^{19}$ are adjusted on arms $B^8$, and are held to their adjustments by bolts $B^9$. The boring and mortising tools are held in position by set-screws $b^2\ b^3$. (Shown in Figs. 19 to 23, inclusive.) The tool-stock $a'$ is adjusted laterally in slots $a^{28}$, and is held to its adjustments by bolts $a^{31}$. The heads $a^2$ are held on their stocks by set-screws $a^{25}\ a^{25}$, and the boring-tools $a^{26}\ a^{26}$ by set-screws $a^{27}\ a^{27}$. Said stocks are vertically adjusted by wedge-bars $B^{17}$ by means of screw $B^{15}$ and wheel $B^{14}$, and are held to their adjustments by bolts $a^{30}\ a^{30}$, as shown in Figs. 24 to 28, inclusive.

The unshaped rails may be piled up between the vertical guides $H\ H^2$ until they reach the top of the same, which gives ample time for the attendant to remove the shaped rails from the end of the machine. As before stated, the first rail placed in the machine is carried away without the action of the boring and mortising tools $b'\ b'$ and $b\ b$, the same having held the next above in suitable position for the action of said tools before being carried away by the carrying-chains, after which, the rail below or at the bottom having been bored and mortised, holds the next above for such action before being carried forward by the chains, and so successively. As the chains take away the rail at the bottom, the rail above by gravity falls down on the chains to be carried forward in turn. The first rail drops from the machine minus the mortises $x'\ x^2$, while all succeeding rails are entirely shaped before they drop from the machine.

Having described my invention and its operation, what I claim, and desire to secure by Letters Patent in a machine for shaping sash-rails, is—

1. The combination, with the friction-cones $a^9\ a^{10}$, of the carrying-chains, with their shafts and disks, and curved guide-bars for guiding the rails $x$, carried by the chains, and cutters operating upon the rails while so carried, the cones carrying the rails $x$ in a course at right angles with its previous motion, with suitable mechanism for rotating the cones, mechanism for rotating the shafts and disks, with suitable mechanism for adjusting, supporting, and securing the cones, substantially as described.

2. The combination, with the friction-cones $a^9\ a^{10}$, which carry the rails $x$ on a different plane and in a course at right angles with that of its previous motion, of the table $a^8$, which surrounds said cones, and which supports the rail $x$, and which is adjustably secured to the frame A, the frame $a^8$, having a guide, 42, with means for adjusting said guide, and with a cutter operating on the rail while fed over table $a^8$, substantially as set forth.

3. The combination, with the table $a^8$, that surrounds the cones and supports the rail $x$ on its lower plane and changed course, of the guide-bar for guiding the rail $x$ while the rail is passing over, and supported by said table in its passage to the cutter-head 35, and cutter-head for molding the rail $x$, with draft-roller 36, for continuing the motion of the rail over said table and under said cutter-head, and springs for pressure on the rail $x$, and friction-cones for forwarding said rail $x$ over said table to said draft-roller, cutter-head, and spring, with suitable mechanism for rotating the draft-roller and molding-head, with their adjusting, securing, and supporting means, adjusting and securing means for the springs, substantially as described.

4. The combination, with the friction-cones and carrying-chains, and curved guide-bars R, provided with mechanism for holding the rail $x$ on the chains, of the vertical holders or guides $H\ H^2$, for holding the rails $x$, and frame A′, for adjusting its operating devices to the various lengths of rails $x$, to be shaped and held by said holders $H\ H^2$, with adjusting and supporting means for the frame A′, with adjusting and securing means for the holders or guides $H\ H^2$, and securing means for the guide-bars R, and cutters acting on the rails while fed by the chains, substantially as described.

5. The combination, with the friction-cones $a^9\ a^{10}$, that carry the rails $x$ on their lower plane and second course, and carrying-chains that carry the rails $x$ on their higher planes and first course, and curved guide-bars that guide said rails $x$ over their first course and plane and to their said lower plane, of the rotary tool-stocks $a'\ a^{20}$, with their boring-tools $a^{26}$, and cutter-heads $a^2$, and carriages $a^3\ a^3$, for reciprocating said rotary tool-stocks, with suitable mechanism for imparting a reciprocating movement to the carriages over their guides, with mechanism for rotating the tool-stocks with their tools, with mechanism for adjusting said tool-stocks, mechanism for securing said relishing-tools, which tools, in their action on the rail $x$, while said rail is carried by said chains in its first course and plane, form the relishes on the ends of said rail, substantially as described.

6. The combination, with friction-cones that carry the rail $x$ in its second course and plane, and chains that carry said rail in its first course and plane, and curved guides that guide said rail over its first course and plane to its said second plane, of the equalizing-saws T T, and tenon-heads T' T', and cope-tools T² T², with tables G G, for supporting said rail $x$, and cope-tools, with suitable mechanism for rotating said saws, tenon-heads, and cope-tools, their adjusting, securing, and supporting means, with securing means for the tables, said saws, in their action on the rail $x$, removing the inequalities from the rail, while the tenon-heads form the tenons thereon, and the cope-tools form the copes, while said rail $x$ is carried by the chains in its first course and over its first plane, substantially as described.

7. The combination, with the friction-cones, chains, and curved guides, that carry and guide the rail $x$ in its different courses and planes, of the tool-stocks B⁷, said stocks carrying boring-tools $b'$ and mortising-tools $b$, and carriage B, for reciprocating said tool-stocks and tools, with mechanism for rotating said boring-tools $b'$, mechanism for adjusting the tool-stocks, securing means for the tools, with suitable mechanism for imparting a reciprocating movement to the carriage B over its guides B³, which reciprocating movement in point of time is just long enough for the action of said tools on the rail $x$, substantially as described.

GEORGE W. STEELE.

Witnesses:
KITTIE INGLIS,
JOHN INGLIS.